March 14, 1933.  F. W. JUENGST ET AL  1,901,603
ELECTRIC TOASTER
Filed Feb. 11, 1932  4 Sheets-Sheet 1

Inventor
Fred W. Juengst
Oscar M. Anderson
by T. Clay Lindsey
Attorney

March 14, 1933.   F. W. JUENGST ET AL   1,901,603
ELECTRIC TOASTER
Filed Feb. 11, 1932   4 Sheets-Sheet 2
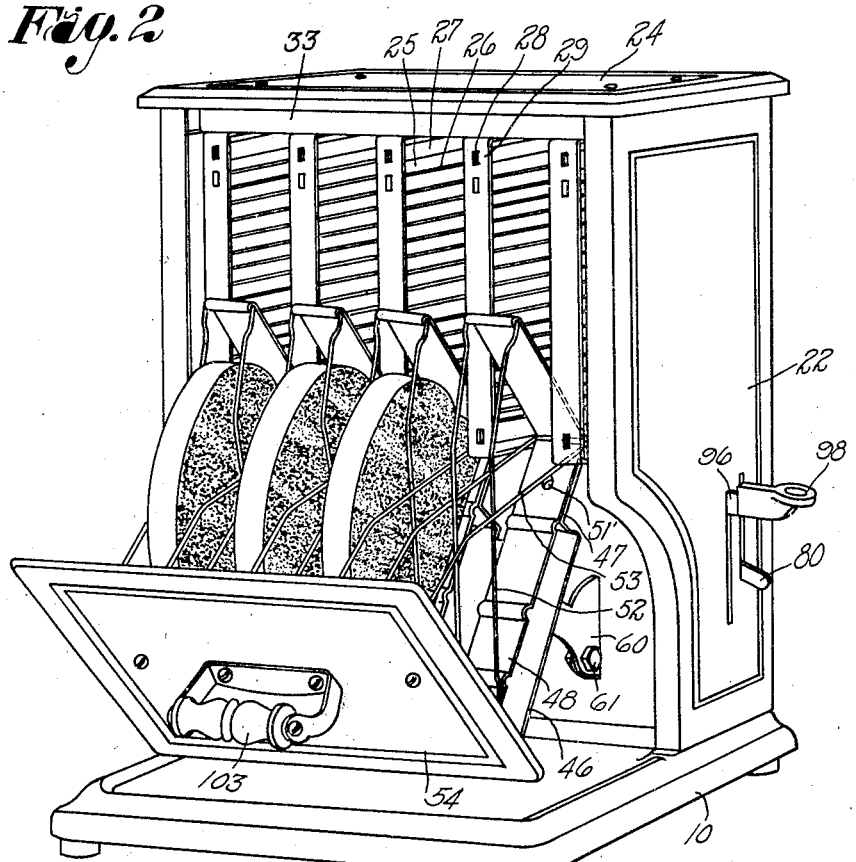
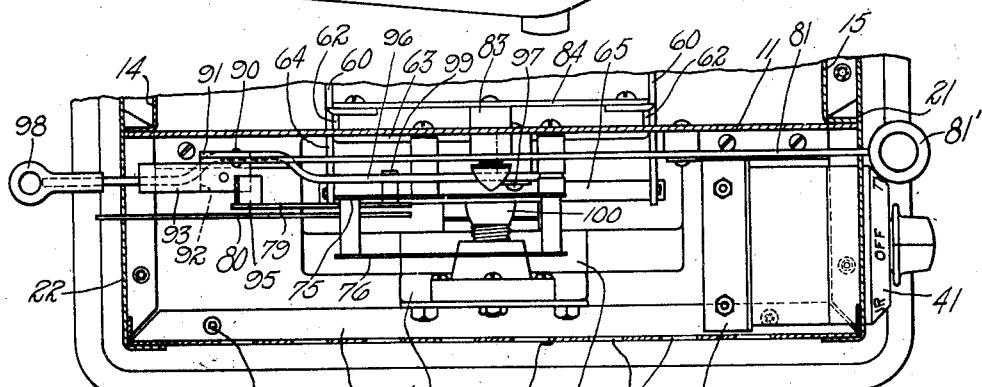
Inventor
Fred W. Juengst
Oscar M. Anderson

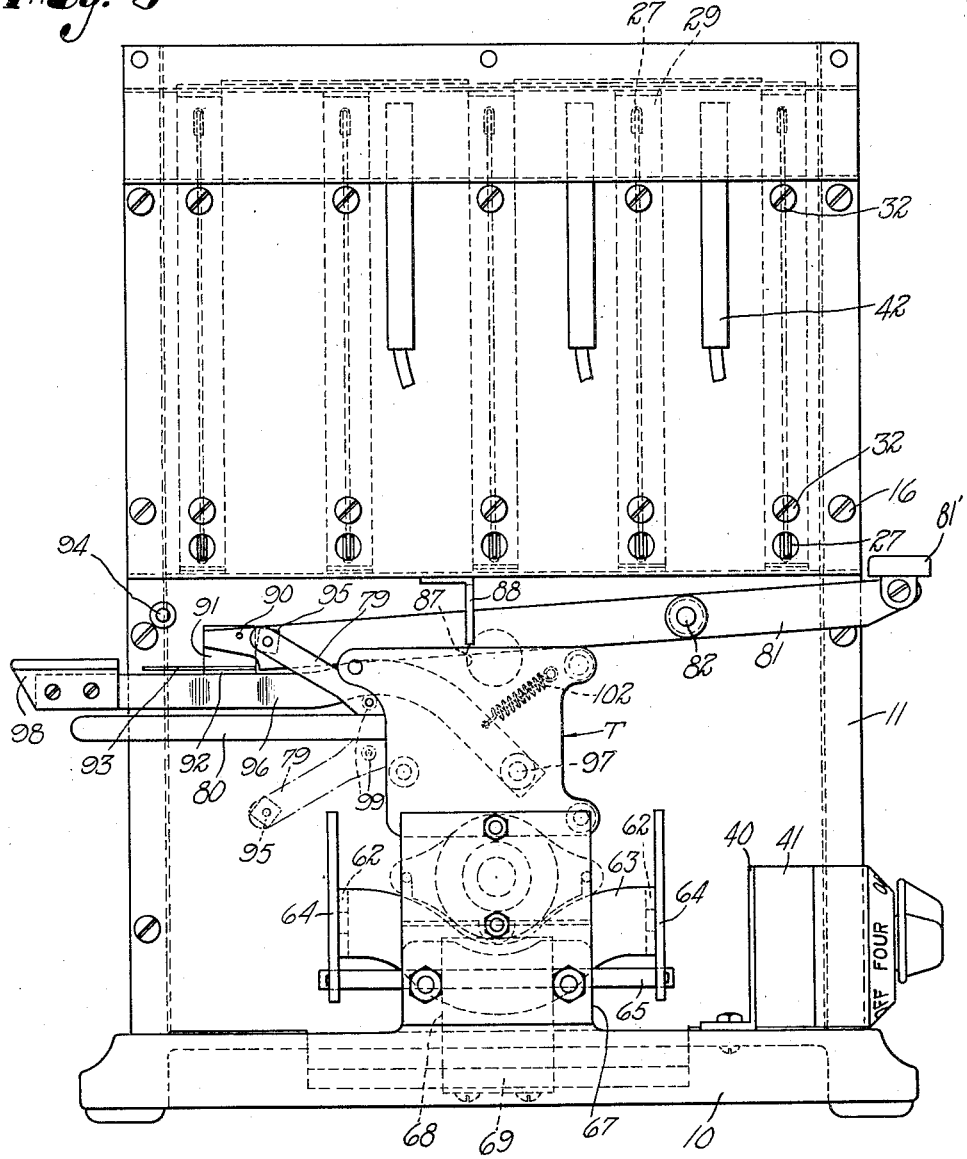

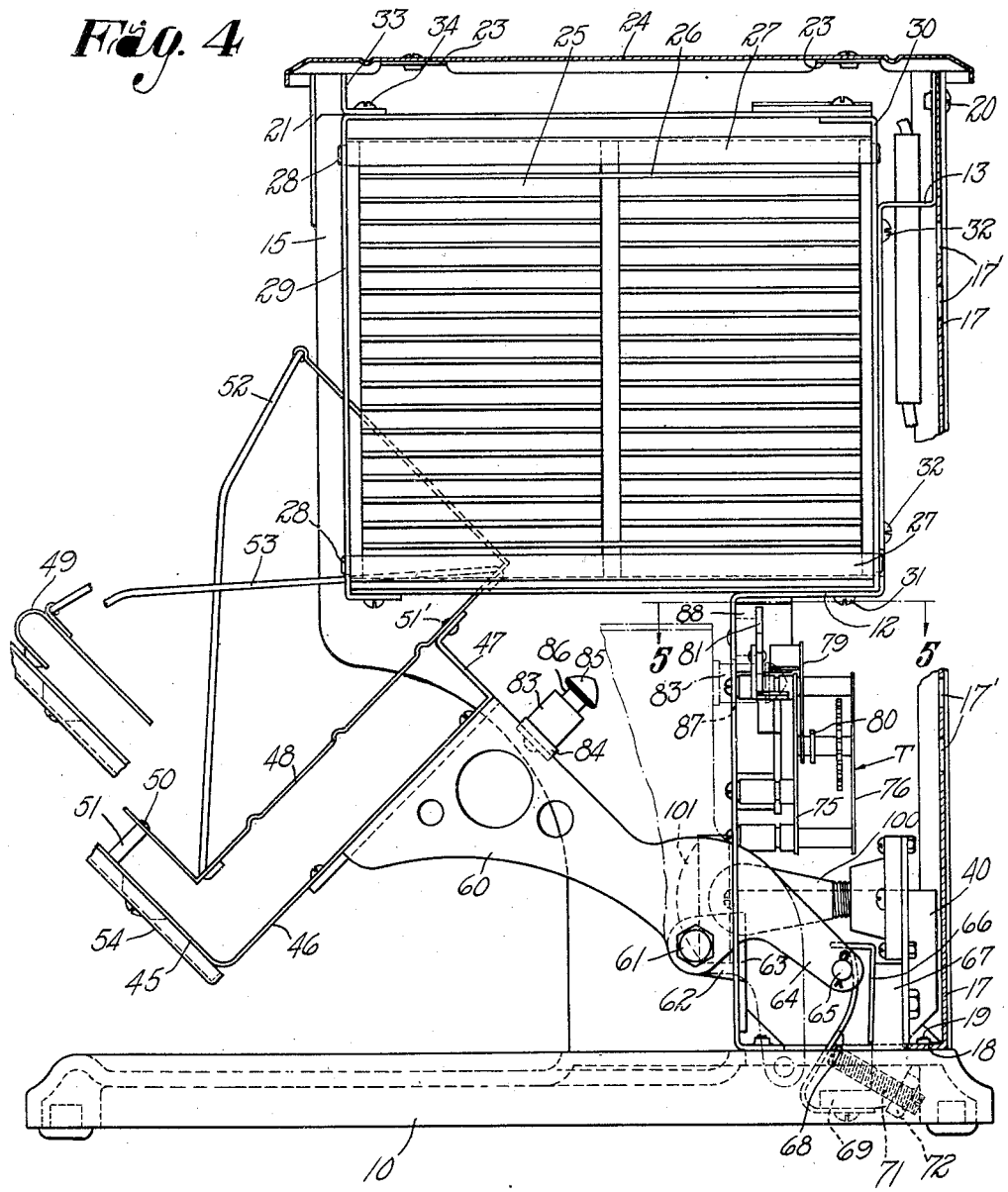

Patented Mar. 14, 1933

1,901,603

UNITED STATES PATENT OFFICE

RED W. JUENGST AND OSCAR M. ANDERSON, OF NEW BRITAIN, CONNECTICUT, ASSIGNORS TO LANDERS FRARY & CLARK, OF NEW BRITAIN, CONNECTICUT, A CORPORATION OF CONNECTICUT

ELECTRIC TOASTER

Application filed February 11, 1932. Serial No. 592,274.

This invention relates generally to electric toasters, and has particular reference to toasters of the type having an enclosed oven and a rack adapted to hold pieces to be toasted within the oven.

An aim of the invention is to provide a toaster of this character having a rack so pivoted and arranged that, when it is outside of the oven, it may be very conveniently loaded with pieces of bread to be toasted, and the toasted pieces are so presented to the operator that they can be very conveniently and readily removed. To this end, we provide an arrangement wherein the rack, which has a plurality of holders for supporting several pieces of bread, is pivoted at a point below the oven and, when released by suitable clock mechanism, will swing forwardly and downwardly to an inclined position directly in front of the operator and, in which position, the toast is substantially entirely removed from the oven so that it may be left in that position without burning, thus eliminating the necessity of turning off the current after the toasting operation has been completed. After the rack has been re-loaded with fresh pieces of bread, it may be readily swung upwardly and rearwardly to bring the holders within the oven, and the rack is held in that position by a suitable lever which, by preference, is time controlled. It may be said here that, while our improved toaster is adapted for general use, it finds particular application in restaurants and the like where it is desired to simultaneously toast a number of pieces of bread.

A further aim of the invention is to provide a toaster of this sort which, while having a relatively large capacity, is comparatively small and compact, and one which is characterized by its simplicity in construction, its economy in manufacture, the ease and facility with which it may be operated and controlled, and its effectiveness in operation.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein is shown, for illustrative purposes, one of the many embodiments which the present invention may take:

Fig. 2 is a view similar to Fig. 1 but looking at the other side of the device with the rack in inoperative or "out" position;

Fig. 3 is a rear view of the device, the rear panel being removed;

Fig. 4 is a right hand side elevational view of the device, the right hand panel and baffle plate being omitted;

Fig. 5 is a transverse sectional view taken substantially on line 5—5 of Fig. 4;

Figure 7:
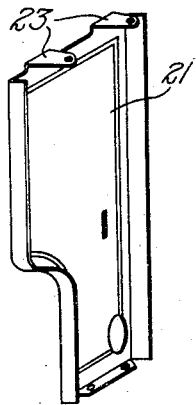
Fig. 7 is a perspective view of the cooperating side panel.
Figure 6:
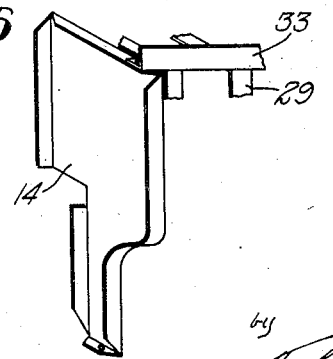
Fig. 6 is a perspective view of one of the side baffles.

Referring to the drawings in detail, the toaster is shown as having a base 10 above which is supported in overhanging relation an oven divided into a plurality of compartments, as hereinafter described more in detail. Extending transversely of the base, adjacent the rear edge of the latter and uprising therefrom, is a vertical supporting plate or frame 11 having, at its intermediate portion, a rearwardly extending offset or shelf 12 and adjacent its upper end a smaller offset 13. Secured to the back of the plate and beneath the shelf 12 is a timing mechanism, designated generally by the letter T. At the opposite sides of the base, and extending forwardly and from the side edges of the back plate, are baffle or side plates 14 and 15, respectively. Each of these plates has its edges out-turned so as to provide flanges, as shown most clearly in Fig. 6. The rear flanges of these baffle plates are connected to the back plate in any suitable manner, as by means of screws 16. The numeral 17 designates the back panel having a flange 18 at its lower edge secured by means of screws 19 to the base. This back panel may have perforations or holes 17' for ventilating the space in which the clock mechanism is enclosed. The upper end of the panel is connected to the upper end of the supporting plate, as by means of screws 20. At opposite sides of the device are also side panels 21 and 22 having inturned flanges shown most clearly in Fig. 7. The rear flanges of these panels overlap side edges of the rear panel 17, and the front flanges of the panels overlap the front flanges of the baffle plates. Suitably secured to inturned ears 23 on the top edges of the side panels is a cover or top panel 24.

The upper half of the supporting plate, the upper portions of the side baffle plates and the cover 24 constitute, respectively, the back, sides and top of an oven which is open at its front and also open at its bottom forwardly of the shelf 12. This oven is divided into a plurality of compartments (in the present instance four) by means of vertical and parallel heating units, each of which includes a pair of mica sheets 25 and a heating wire or element 26 wound thereon. The upper and lower edges of the sheets of mica are supported in U-shaped or channeled holders 27, each having a lug 28 at its forward and rear ends. These lugs take into openings provided in a rectangular frame composed of two right-angled strips 29 and 30 connected together as illustrated. These frames, at their rear ends, rest upon the shelf 12 and are secured thereto by suitable means, such, for example, as screws 31. The vertical rear portions of the frames are secured to the supporting plate 11 by screws 32. In order to hold the front ends of the unit frames in proper spaced relation, we provide an angle bar 33 resting at its ends on the upper flanges of the baffle plates. The frames are secured to the horizontal web of this bar by means of screws 34 or other suitable fastening means.

Suitably secured to a bracket 40 carried by the base between the supporting plate 11 and the back panel is a switch 41 appropriately connected to the heating wires or elements 26, the connections 42 being shown only in part as they will be well understood by those familiar with the art. The switch may be so connected up to the heating elements that in one position of the switch all of the heating elements are in circuit, and in another position only a sufficient number of elements are in circuit to toast less than four (for example, two) pieces of toast. The switch may bear the indicia Off—Four—Off—Two, as illustrated in the drawings.

The bread carrying rack has a frame member in the form of a right-angled sheet of metal so as to provide a front wall 45 and a bottom wall 46. The bottom wall has, at its rear end, upwardly and then rearwardly extending fingers 47 spaced apart so that they may be received by the respective compartments into which the oven is divided. The rack also has a plurality of toast holders, each including a strip of metal 48 bent generally into open rectangular shape in order to provide a bottom, a front and a rear wall. The forward upper ends of these strips are rolled forwardly and downwardly to provide tabs 49 which are secured to the front wall 45 of the frame member. The front walls of the holders 48 are also secured to the front wall of the frame member by rivets 50 about which are sleeves 51 for holding these walls in spaced relation. The bottoms of the holders 48 rest upon and are secured, as by rivets 51', to the respective fingers 47, as shown most clearly in Fig. 4. Each holder also has at each side a pair of crossed guard wires 52 and 53. Secured to the front wall of the frame member is a front panel 54 which is suitably finished to give a pleasing appearance. It will be understood that each of the toast holders is open at its top and that, when the rack is in operative position, these holders are respectively located in the compartments of the oven with the front panel closing the front of the oven and the bottom wall of the rack substantially closing the bottom of the oven.

The rack is supported by a pair of hinge plates or leaves 60 pivoted on alined studs 61 located at a substantial distance beneath the oven. Each of these hinge leaves comprises a metal plate having a flange at its upper end, and the bottom wall of the rack frame is secured to these flanges, as shown in Fig. 4. The studs or pintles 61 are supported by ears 62 of a bracket 63 suitably secured to the rear face of the supporting plate 11 near the lower edge of the latter. The ears extend forwardly through suitable openings in this plate. The hinge leaves have, behind the supporting plate 11, extensions or arms 64 which carry a stop pin 65 adapted to engage a stop bracket 66 in order to limit the extent of the opening movement of the bread rack. The bracket 66 may be secured to an integral lug 67 on the base. For the purpose of bringing the bread rack to a gradual stop as it swings downwardly and forwardly and thus eliminate jar and shock, a stop or brake spring 68 is provided. This spring is secured to a lug 69 on the bottom of the base and is somewhat curved into the path of swinging movement of the pin. When the bread rack swings from its operative to its open position, this pin engages the spring so that the latter has a braking effect on the rack. The spring 68 may be adjusted by means of a screw 71 and a nut 72.

Figure 1:
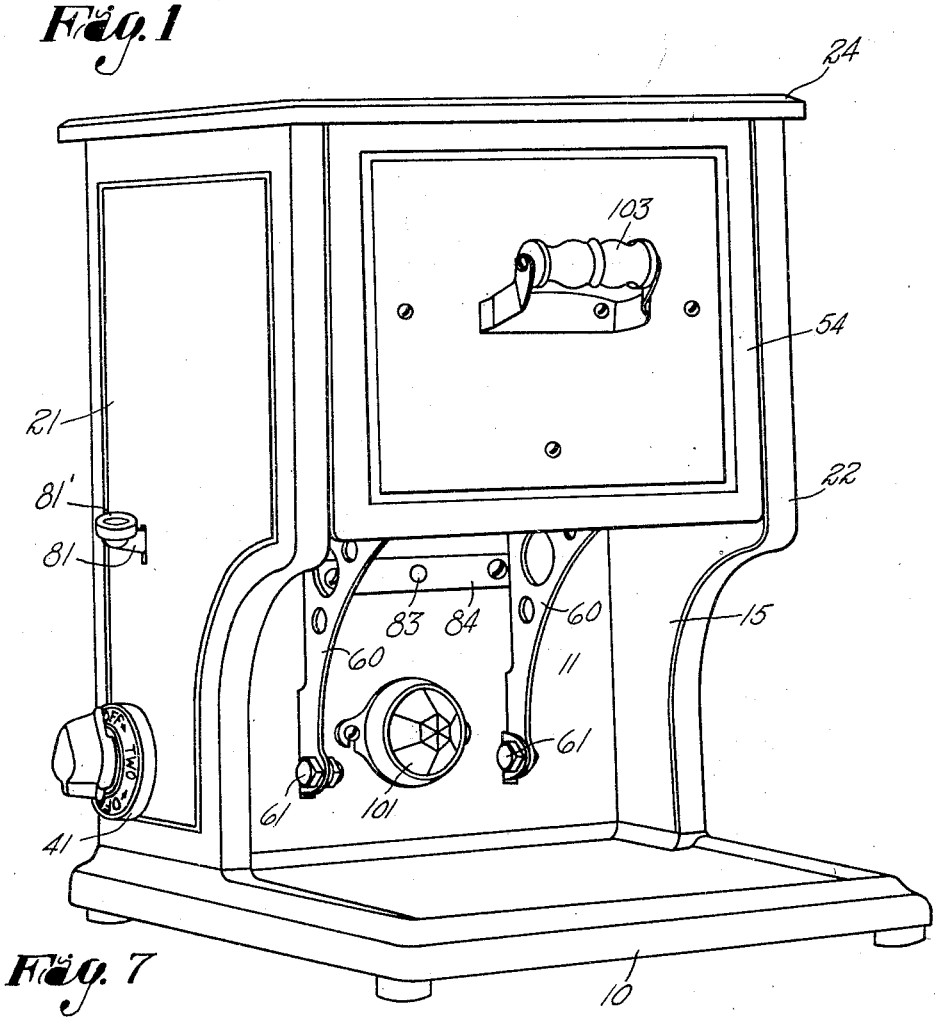
Figure 1 is a perspective view looking at the front and one side of the toaster, the rack being in toasting or operative position.

As previously stated, the timing or clock mechanism T for controlling the release of the toast carrying rack is secured to the supporting plate 11. This timing mechanism is housed in the compartment between the back panel and the supporting plate and beneath the oven so that it will not be adversely affected by the heat of the oven. The timing mechanism may be of any suitable type, that shown in the drawings being illustrated more or less diagrammatically as it is of an old and well-known kind. It is here sufficient to say that it has a front and a rear plate 75 and 76 between which are located suitable gears and a spring, not shown. It has an actuated arm 79 which, when released, moves with a snap action from the broken line position to the full line position shown in Fig. 3. The interval of time lapsing between the setting of the arm to the broken line position shown in Fig. 3 and its release is determined by the adjustment of a setting lever 80. If it is desired to have a dark brown toast, the setting lever 80 may be adjusted substantially to the position shown in Fig. 3. If a lighter brown toast is desired, the lever will be moved down further. The actuated arm operates a lock release lever 81 pivoted to the supporting plate 11, as at 82, and adapted to cooperate with a stud 83 carried by the bread rack. The lever 81 may have a knob 81' on its free end. In the present instance, this stud is fixed to a cross strip 84 secured to the hinge plates 60. It terminates in a tapered or conical head 85 and it has a groove 86 forwardly of this head. The supporting plate has an opening 87 through which the stud extends when the rack is in the operative position shown in Fig. 1. 88 designates a guide for the release lever 81. The release lever is normally in the position shown in Fig. 3 and, when the rack is swung from the "out" position of Fig. 4 to the operative position shown in Fig. 1, the stud 83 is projected through the opening 87 and the head of the stud cams the right hand end of the lever upwardly until the groove 86 is in the plane of the lever when the lever will drop down and engage in that groove, thus latching the toast rack in operative position until the lever 81 is again raised. By preference, the left hand end of the lever extends beyond the left hand panel, as shown in Fig. 1, so that the operator may raise the other end of the lever and thus release the rack at any time, irrespective of the clock mechanism. The right hand end of the lever (which is the left hand end in Fig. 3) has pivoted to it, as at 90, a flap 91 provided with a rearwardly extending lug 92 to the upper face of which is secured a strip of fibre 93. The free end of this strip is adapted to engage a pin 94 projecting rearwardly from the supporting plate 11 in order to limit the extent to which the right hand end of the release lever is raised. Carried by the free end of the actuated arm 79 of the clock mechanism is a small square block 95 which, when the actuated lever is turned upwardly, engages the bottom of the lug 92 and thereby raises the right hand end of the release lever in order to release the rack. When the arm 79 is moved down to the broken line position shown in Fig. 3, it will engage the upper face of the lug 92 (or the fibre facing 93 thereon) thereby swinging the flap about its pivot 90, and thus the lug may be moved past the flap. The arm 79 is moved downwardly and the spring (not shown) of the clock mechanism is wound up by depressing an operating lever 96 which engages a roller 99 on the arm 79. The lever 96, pivoted at 97, has its free end extending through a vertical slot in the right hand panel 22. This free end has a finger piece 98. A spring 102 normally urges the operating lever to its normal position, shown in Fig. 3. In order to determine at a glance when the heat is on the oven, there may be provided a light 100 positioned behind a lens 101 suitably carried by the supporting plate beneath the oven. The light may be connected to the switch 41.

The operation of our improved toaster is briefly as follows: When the toast rack is in the inoperative or "out" position shown in Figs. 2 and 4, the operator may place pieces of bread in the several holders 48 and then, by means of the handle 103, swing the rack upwardly and rearwardly to the operative position shown in Fig. 1. When the rack is brought to this position, the stud 83 will be automatically locked by the release lever 81, as previously described. The setting lever 80 having been adjusted, the operating lever 96 is depressed so as to move the actuated arm 79 downwardly to the broken line position shown in Fig. 3. The timing mechanism will now operate and, after a predetermined period of time, the arm 79 will be released whereupon it will snap upwardly and engage the flap 91 causing the release lever to be raised and thus disengage that lever from the stud with the result that the rack is free to move forwardly and downwardly under the force of gravity to the inoperative or loading position shown in Figs. 2 and 4.

It will be observed from the foregoing description, taken in connection with the accompanying drawings, that the toast rack is pivoted at a substantial distance below the oven so as to permit the holders to be moved to a loading position where the holders are substantially outside of the oven. This permits of the toasted pieces remaining in the holders without danger of being burned although the heat is maintained in the oven. As previously stated, the toast holders, when in loading position, are so presented to the operator that these holders may be very quickly and conveniently loaded and unloaded. The general arrangement of the various parts and instrumentalities permits of a very compact and simple arrangement and provides a device which is of very neat and pleasing design.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. An electric toaster having an oven provided with a compartment open at its front and at its bottom, a toast rack having a holder open at its top and positioned within said compartment when the rack is in operative position, said rack being pivoted at a point below said oven for forward and downward swinging movement, means for latching said rack in upright operative position, and time controlled means for controlling said latching means.

2. An electric toaster having an oven provided with a plurality of parallel spaced apart compartments each of which is open at its front and its bottom, a toast rack pivoted at a point below the oven and adapted to swing forwardly and downwardly about said pivot under the force of gravity and into inoperative position, a plurality of toast holders carried by said rack and received by the respective compartments when the rack is in upright operative position, and time controlled means for releasing said rack from operative position.

3. An electric toaster having an oven with a plurality of electric heating units dividing said oven into a plurality of parallel spaced compartments each open at its front and at its bottom, a rack pivoted on a transverse horizontal line a substantial distance beneath said oven, said rack having a plurality of spaced apart toast holders each open at its top, said holders being respectively positioned within said compartments when said rack is in upright operative position, said rack being adapted to swing about said pivot under the force of gravity downwardly and forwardly and to a loading position where the holders are substantially out of the oven and the open ends of the holders face upwardly and forwardly, and means for latching said rack in upright operative position.

4. An electric toaster having an oven supported at its rear and provided with a compartment open at its front and at its bottom, an electric heating unit to each side of said compartment, an unobstructed space being provided beneath said oven, a toast rack pivoted on a transverse horizontal line a substantial distance beneath the rear end of said oven, said rack having a toast holder open at its top and positioned within said compartment when the rack is in upright operative position, said rack being adapted to swing about said pivot under the force of gravity downwardly and forwardly and to a loading position where the holder is substantially out of the oven and the open end of the holder faces upwardly and forwardly, means for latching said rack in upright operative position, and time controlled mechanism behind said space for controlling said latching mechanism.

5. An electric toaster having a base, an oven, means for supporting said oven above said base, there being a free unobstructed space between said base and oven forwardly of said supporting means, said oven having a compartment open at its front and at its bottom, electric heating units forming the sides of said compartment, a toast rack, pivot means carried by said supporting means adjacent said base and at the rear portion of said space, said rack being hingedly supported by said pivot means for swinging movement, said rack having a toast holder open at its top adapted to be received by said compartment, said rack being adapted to swing downwardly and forwardly to inoperative position where the open end of the holder faces upwardly and forwardly, means behind said supporting means for latching said rack in upright operative position, and means supported by said supporting means and rearwardly thereof for controlling said latching means.

6. An electric toaster having an oven, a plurality of parallel electric heating units dividing said oven into a plurality of compartments each of which is open at its front and at its bottom, a toast rack pivoted at a point below the oven and adapted to swing forwardly and downwardly about its pivot under the force of gravity; said toast rack having a frame member closing the bottom and front of said oven, a plurality of spaced apart holders carried by said frame member and adapted to be respectively received by said compartments, each holder being open at its top, and hinge plates connected to the bottom of said frame member; and means for latching said rack in upright operative position.

7. An electric toaster having a base, a supporting plate secured to and arising from said base, an overhanging oven in part carried by said supporting plate, said oven having top and side walls and including a plurality of spaced apart electric heating units supported by said supporting plate, said units dividing said oven into a plurality of compartments each open at its front and at its bottom; a toast rack having a frame member adapted to close the front and bottom of said oven, a plurality of holders carried by said frame member adapted to be respectively received by said compartments, and hinge leaves carrying said frame member; a transversely extending pivot for said hinge leaves located beneath said oven, and means for latching said rack in upright position.

8. An electric toaster having a base, a transversely extending supporting plate arising therefrom, a pair of spaced side plates and a top panel, said top panel and the upper portions of said supporting plate and side plates forming an oven open at its front and at its bottom, a plurality of electric heating units secured to said supporting plate in parallel spaced apart relation and dividing said oven into a plurality of compartments; a toast carrying rack pivoted to said supporting plate adjacent said base and having a frame member closing the front and bottom of said oven, and toast holders secured to said frame member and adapted to be respectively received by said compartments; and means for latching said rack in upright position, said rack being adapted to swing under the force of gravity downwardly and forwardly when it is released.

9. An electric toaster having a base, a sheet metal transversly extending supporting plate arising therefrom and having a shelf portion between its ends, side plates connected to the side edges of said supporting plate and extending forwardly therefrom, a back panel, side panels extending from the back panel to the forward edges of said side plates, the upper portion of said supporting plate and the upper portions of said side plates respectively forming the back and side walls of an oven open at its front and at its bottom, heating units resting on said shelf and secured to said supporting plate, said heating units dividing said oven into a plurality of parallel compartments, a rack pivoted on a transverse line a substantial distance beneath said oven and having a plurality of toast holders adapted to be respectively received by said compartments, means behind said supporting plate and beneath said shelf for latching said rack in upright operative position, and clock mechanism for controlling said latching means.

10. An electric toaster having an oven provided with a compartment open at its front and at its bottom, a toast rack having a holder open at its top and positioned within said compartment when the rack is in operative position, said rack being pivoted at a point below said oven for forward and downward swinging movement to an inoperative position, means for braking the downward movement of said rack, means for latching said rack in upright position, and time controlled means for controlling said latching means.

11. An electric toaster having an oven provided with a plurality of compartments each of which is open at its front and at its bottom, a toast rack pivoted at a point below the oven and adapted to swing forwardly and downwardly about said pivot under the force of gravity and into inoperative position, a plurality of toast holders carried by said rack and received by the respective compartments when the rack is in upright position, time controlled means for releasing said rack from operative position, and a spring for retarding the rack as it approaches its inoperative position.

12. An electric toaster having an oven provided with a compartment open at its top and at its bottom, a toast rack having a holder open at its top and positioned within said compartment when the rack is in operative position, said rack being pivoted at a point below said oven for forward and downward swinging movement into an inoperative position, a latch lever; a stud carried by said rack and having a conical head, and a groove in front of said head; and time controlled means for raising said lever, said head being adapted to raise said lever when the rack is moved to operative position and said lever engaging in said groove when the rack is in operative position.

FRED W. JUENGST.
OSCAR M. ANDERSON.